(No Model.) 2 Sheets—Sheet 1.
J. ROBERTSON.
APPARATUS FOR MANUFACTURING SOLDER RODS.
No. 398,976. Patented Mar. 5, 1889.
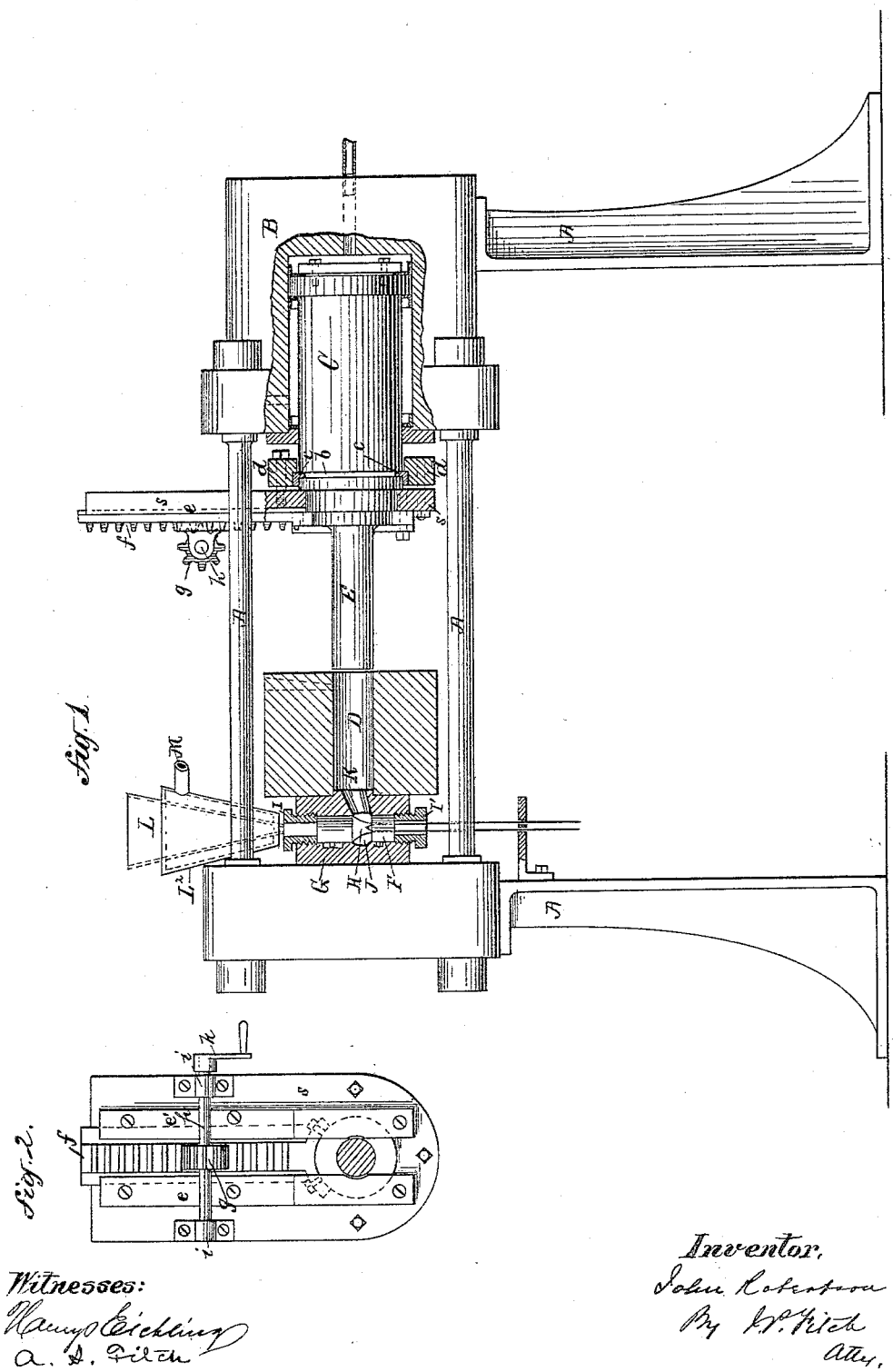

(No Model.) 2 Sheets—Sheet 2.
J. ROBERTSON.
APPARATUS FOR MANUFACTURING SOLDER RODS.
No. 398,976. Patented Mar. 5, 1889.
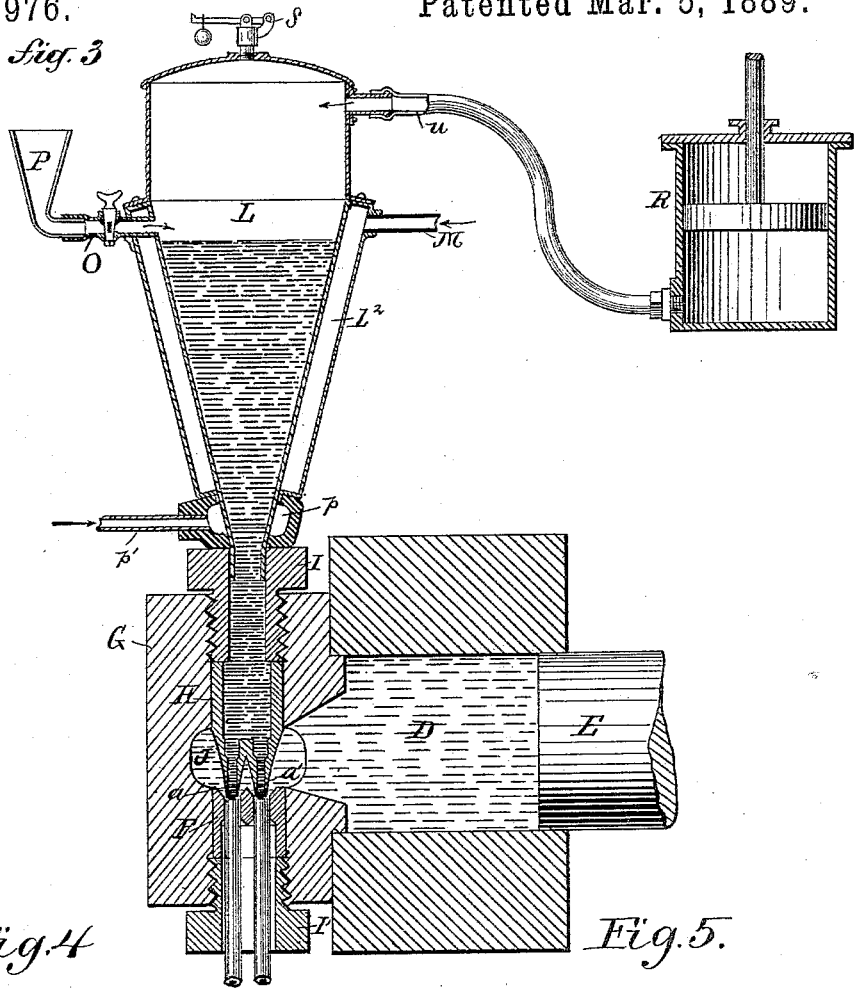
Fig. 3
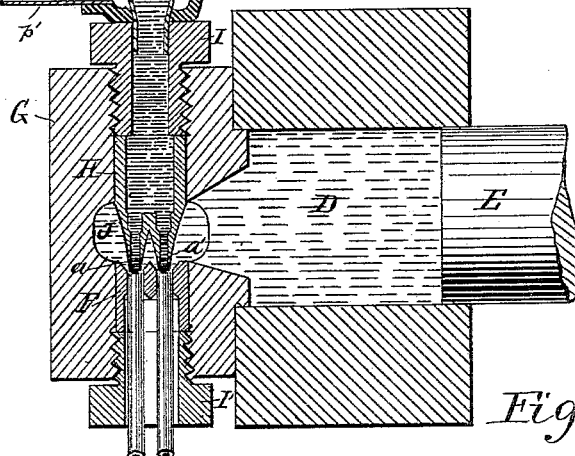
Fig. 4     Fig. 5.
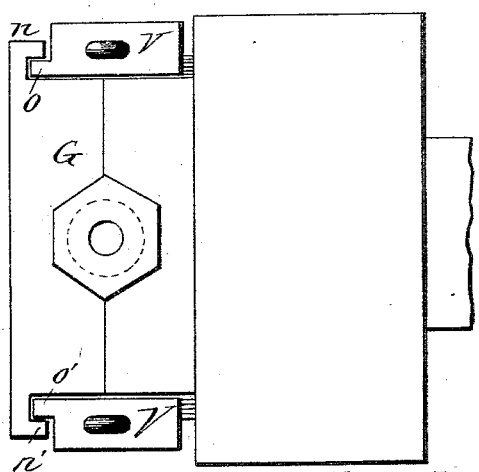
Witnesses:
Inventor
John Robertson

UNITED STATES PATENT OFFICE.

JOHN ROBERTSON, OF BROOKLYN, NEW YORK, ASSIGNOR OF ONE-HALF TO JAMES HARDIE, OF SAME PLACE.

APPARATUS FOR MANUFACTURING SOLDER-RODS.

SPECIFICATION forming part of Letters Patent No. 398,976, dated March 5, 1889.

Application filed September 28, 1886. Renewed October 8, 1888. Serial No. 287,556. (No model.)

*To all whom it may concern:*

Be it known that I, JOHN ROBERTSON, of Brooklyn, county of Kings, and State of New York, a citizen of the United States, have invented an Apparatus for Manufacturing Soldering-Rods, of which the following is a full, clear, and exact description, reference being had to the accompanying drawings, forming part of this specification.

The purpose of my invention is to render it practicable to combine with a seamless continuous solder-pipe of indefinite length a core of resin or other analogous flux which is solid at the ordinary temperature of the atmosphere and liquid at or about the temperature of steam—212° Fahrenheit—by introducing the flux in a melted or fluid state into the pipe while the pipe is in the act of formation by pressure in a lead-press. In carrying out this purpose I employ a lead-press of the peculiar construction herein described for making pipe of soft metal by forcing the metal through a die around a core, in which press the die and core are in a fixed position and at rest when the press is in operation, and I combine with such a press a fixed stationary heating-vessel for holding, heating, and melting resin or analogous flux, and conducting it while heated and melted into the hollow core in the press.

Figure 1 is a side elevation, partly in section, of the combined lead-press and vessel for holding and heating the flux and conducting it to the hollow core in the press. Fig. 2 is a front elevation of a frame carrying a plunger detached from its connections shown in Fig. 1; and Fig. 3 is a vertical longitudinal section, on a larger scale than that of Fig. 1, of the solder-chamber, plunger, die, and hollow core shown in Fig. 1 with my attachments, whereby the resin is introduced into the hollow solder-rod, as above spoken of. Figs. 4 and 5 are detailed views showing devices for heating the core-holder and core, particularly described hereinafter.

A is a frame on which the working parts are mounted.

B is the cylinder and C the ram forming a hydraulic press.

D is the solder or lead chamber in which the solder is placed to be forced through the die, and E is the plunger arranged to be forced into the solder-chamber by the action of the ram. The chamber D may be secured and supported in the frame in any suitable way.

F is the die, G the die-holder, and H the hollow core. The dies are held in place in the die-holder by hollow screw-plugs I I'.

J is a chamber in the die-holder, into which the solder is forced out of the chamber D through the opening K in the die-holder, and out of which chamber J it is forced through the die and around the core in the fabrication of pipe. The die and core may be double, as represented in the drawings, or still further divided so as to make two or more pipes at once.

It will be observed that in this press all its parts excepting the ram and plunger are fixed permanently in position, and so remain during the operation of making pipe; also, that the chamber J, in which is the pipe-forming core H and the die, is separate from the lead-chamber that is traversed by the plunger, whereby the core may be extended upward to or beyond the upper face of the core-holder G without passing through the lead-chamber, and the operation of continuous pipe-making is not interfered with by the removal of the plunger from the lead-chamber and the filling and refilling of the chamber with lead. In this respect this press is to be distinguished from the class of lead-presses in which the pipe-forming die and core are arranged to be within the lead-chamber and to travel with the ram and plunger.

I will proceed to describe the attached devices for the introduction of resin or flux into the hollow rod made by the press.

L is a vessel arranged and maintained, preferably, in a vertical position, with the funnel end inserted in the hollow plug I, thus leading into the hollow core H. The vessel is supported and maintained permanently in a fixed position, which may be done by fixing it rigidly on the frame of the press in any suitable way, with its lower end connected to and leading into the upper end of the core H, which is also held and maintained in a fixed position during the operation of making pipe. This vessel is provided with a jacket, $L^2$, surrounding it, with a pipe, M, leading therefrom to a steam or hot-air supply source. (Not shown.) The resin is to be placed in this vessel or heater and melted by the heat supplied within the jacket. The resin, being maintained by these means in a melted state during the operation of making pipe, will flow down into the core and out through the nozzle or nozzles *a a'* of the core into the pipe or hollow rod at the point where and at the moment when the pipe is formed. In order to insure the resin being in a sufficiently heated and fluid condition to flow readily and steadily through the core, I provide means to apply a higher degree of heat, if found advisable, independent of that in the jacket, at the lower end of the funnel or heater below the jacket. To this end I provide and arrange a separate heating device for heating said end of the heater or vessel. This may be a common compound blow-pipe for burning gas mingled with air under pressure, the flame being directed onto the said end. One or more of these jets may be employed opposite to each other. Instead of a flame, highly-heated steam or air may be employed, conducted into a chambered ring, *p*, by a pipe, as *p'*, placed around said end. This independent heating may be regulated to suit the exigency of the occasion to maintain the resin in a properly-melted condition at the moment of its entrance into the core. After the resin has entered the said core it is essential that it should not be chilled while flowing through the core and into the pipe to be formed around the point or nozzle of the core; but this is likely to occur, as the core, being inclosed within the die and core-holder G, will have the temperature of the latter, which is likely to be so low as to cause the chilling and stiffening of the resin in the core. To obviate this I make provision for heating the said core-holder, and through the holder the core, and continuing the heating during the operation of the apparatus. To this end I employ blocks or heavy plates, V V, of iron, highly heated, placed and held against the sides of the core-holder G, as shown in Fig. 5. These blocks are held and secured in position against the core-holder by means of angle-irons *n n'*, forming a rabbet or groove into which flanges *o o'* on said blocks may pass, thus enabling the blocks to be readily applied to the core-holder and removed therefrom for the purpose of being reheated and reapplied. I have shown in the drawings, and prefer to employ, two blocks—one on each of two sides of the core-holder; but one block, if kept highly heated, will answer the purpose. It should be observed that the said core within the holder cannot be sufficiently heated by employing steam or any heated liquid applied to the said holder. The heat required to maintain the flux in a sufficiently liquid state while flowing through the core is greater than can be obtained from the application of ordinary steam or heated liquids. I therefore employ blocks or plates of highly-heated iron, as above described.

I am aware that in a lead-press provision has been made for heating the core-holder, and through it the core, by means of a jacket surrounding the holder and steam or a heated liquid introduced into the jacket. This will not serve my purpose, as described, and I do not claim it.

In the process of making pipe, as described, there is a tendency to the formation of a vacuum in the pipe as the pipe is formed and leaves the nozzle of the core, which is of course filled by air passing in through the pipe from its outer end so long as the pipe remains open. If the pipe is by any means closed, the partial vacuum thus formed remains. By closing the pipe when the end at the outset leaves the die the said vacuum is formed, and thus the resulting atmospheric pressure upon the flux in the heater or vessel is availed of to supplement its gravity to force it through the core into the pipe as the latter is formed; but it may sometimes be found desirable to apply to the flux a greater than atmospheric pressure. I accordingly make provision to apply such pressure. To this end I close the top of the vessel or heater L, as shown in Fig. 3, and provide a pipe, *u*, leading therefrom to a source of air-supply under pressure. This source may be a cylinder closed at the bottom, having a piston weighted to give the required pressure, all as seen at R. Into this closed heater the flux may be introduced as required by being previously melted and poured in through a pipe, O, provided with a funnel, P, and a stop-cock, as shown. A safety-valve, S, arranged at the top of the heater, may be employed to maintain a uniform pressure of the air on the flux.

The plunger E is separate from the ram C, in order that it may be raised vertically from its position in line with the said ram and chamber D. It is, moreover, so connected with the ram as to move with it, while still capable of being raised above the chamber D and lowered again. This may be accomplished as follows: Near the outer end of the ram is placed a collar, which may be conveniently done by cutting in the ram a groove, *b*, in which is fitted a ring, *c*, formed in two parts for insertion in the groove, this ring forming the collar. Over the collar *c* there is fitted onto the end of the ram a larger ring, *d*, having a rabbet, into which the said collar fits, as shown in Fig. 1. The ring *d* cannot when thus arranged move off of the end of the ram, as is obvious. To this ring is bolted the frame or plate *s*, provided with wings *e e'*, in which is fitted to slide vertically a rack-bar, *f*. A toothed pinion, *g*, fast on a shaft, *h*, which rotates in bearings *i i'* on the said frame, meshes with the said rack. The lower end of the rack-bar is bolted to the head of the plunger E. By means of a crank, *k*, on the shaft *h*, the rack-bar may be raised and lowered, carrying with it the plunger. The object of making the plunger separate from the ram and providing for raising and lowering it is to be able conveniently to introduce the solder into the chamber D.

An ingot of solder being placed in the solder-chamber, it is forced by the ram and plunger into the chamber J, and out through the die around the core, the die and core, also the described flux holding apparatus, remaining in a fixed position during this operation, thus forming a continuous hollow solder-rod, while just as the said rod is formed and while in the act of formation the flux flows out of the tip of the core and fills the hollow rod.

There are manifest advantages in having the described flux holding and heating apparatus also supported and maintained in a fixed position, instead of moving up and down with the ram and plunger of the press. Among them may be specially noticed economy of construction and convenience of use, it being thus practicable to employ rigid pipes leading to and from the heating-vessel and to avoid the use of flexible tubes or movable joints in the pipes; also, it being the special design of the described combination to make continuous resin-core solder-pipes of indefinite length, a lead-press of the peculiar construction shown and described as one of the elements of the combination is essential.

I do not here claim the combined solder and flux made by this machine, reserving the same for a separate application, Serial No. 214,735, for Letters Patent filed simultaneously herewith.

What I claim herein as my invention, and desire to secure by Letters Patent, is—

1. The combination, with the combined lead-press and flux containing and heating vessel, of the described separate heating devices located at and so as to heat the lower end of the said vessel, as and for the purpose specified.

2. In the described lead-press, having the core-holder G and contained core H, the combination, with said holder and core, of highly-heated blocks of iron, V V, one or more, constructed and applied as and for the purpose described.

JOHN ROBERTSON.

Witnesses:
A. S. FITCH,
A. G. N. VERMILYA.